United States Patent Office 2,842,541
Patented July 8, 1958

2,842,541

CYANOETHYL ETHERS

Glen E. Journeay, Texas City, Tex., assignor to Monsanto Chemical Company, St. Louis, Mo., a corporation of Delaware No Drawing. Application July 27, 1954
Serial No. 446,180

7 Claims. (Cl. 260—231)

This invention relates to the preparation of cyanoethyl ethers of polysaccharides and, more particularly, to a new process for preparing cyanoethyl ethers of cellulose.

It is well known that the introduction of cyanoethyl groups into cellulose results in the production of cellulose derivatives having many desirable properties and such derivatives have many commercial applications. These ethers have generally been prepared in the prior art by reacting cellulose with acrylonitrile. Now, in accordance with this invention, it has been found that cyanoethyl ethers of polysaccharides such as, for example, cyanoethyl ethers of starch and cellulose, may be prepared by reacting a polysaccharide with $\beta,\beta'$-oxydipropionitrile in the presence of an alkaline agent. The reaction is conveniently carried out by mixing the polysaccharide, preferably in a fibrous or finely divided state, with enough of a dilute solution of a strongly basic hydroxide to thoroughly wet the mass. The $\beta,\beta'$-oxydipropionitrile is then added with effective agitation after the alkali has been taken up by the polysaccharide. The whole mixture is maintained at reaction temperature for sufficient time to allow the reaction to go to completion. Recovery of the cyanoethylated material is then generally effected by thoroughly washing the reaction mixture with water and drying.

The following examples will illustrate the preparation of cyanoethyl polysaccharides in accordance with the invention.

*Example I*

Approximately 3.3 g. of dry cotton was soaked for ten minutes in a 2% caustic solution and the excess solution was squeezed out leaving a total of 6.6 g. of wet cotton representing a caustic solution uptake of 100%. The caustic-treated cotton was immersed in 100 ml. of $\beta,\beta'$-oxydipropionitrile and the mixture was heated to a temperature of about 100° C. for two hours on a steam bath. It was then allowed to stand at room temperature for two days. The reaction product was washed free of $\beta,\beta'$-oxydipropionitrile and dried. The product contained by analysis 1.7% nitrogen which corresponds to 0.20 nitrile group per glucose unit.

*Example II*

Approximately 3 parts by weigth of dry "non-absorbent" cotton was soaked in 5% sodium hydroxide solution for ten minutes. Excess solution was squeezed out and the wet cotton, approximately 6 parts by weight, representing an uptake of caustic solution of 100%, was transferred to a test tube where it was covered with $\beta,\beta'$-oxydipropionitrile. The tube was placed in a water bath at 50° C. for about three hours. The reaction product after washing to remove the $\beta,\beta'$-oxydipropionitrile and drying contained by analysis 1.2% nitrogen which corresponds to the introduction of 0.14 nitrile group into each glucose unit.

*Example III*

Approximately 10 parts by weight of gelatinized starch is suspended in 60 parts by weight of a 4% caustic solution and approximately 40 parts by weight of $\beta,\beta'$-oxydipropionitrile is added to the suspension. The reaction mixture is heated to a temperature of 80° C. and maintained at that temperature for a period of about 4 hours. The reaction mixture is then neutralized by the addition of dilute acetic acid and poured into a large quantity of methanol. The precipitated cyanoethyl ether of starch is kneaded twice with alcohol and then vacuum dried.

*Example IV*

One hundred parts by weight of wood pulp is steeped for ten minutes in 2% sodium hydroxide and the excess solution is drained off leaving a total of 250 parts by weight of wet wood pulp. The impregnated pulp is then immersed in 1000 parts by weight of $\beta,\beta'$-oxydipropionitrile in a suitable container and the resulting mixture is heated to a temperature of between 70 and 100° C. for from about 3 to about 5 hours. The resulting solution is cooled and poured into a large quantity of methanol. The cyanoethyl cellulose ether which is precipitated is thoroughly washed with water and then is dried in an oven at 95–100° C.

The reaction of the invention will proceed readily with any polysaccharide such as all forms of cellulose, starch, cellodextrins, pectic substances, etc. The various types of cellulose suitable, in addition to those mentioned in the examples, include natural fibers such as jute, ramie, linen, etc., regenerated cellulose such as viscose, or even partially substituted derivatives containing free hydroxyl groups such as methyl cellulose or ethyl cellulose. The starch used may be of root origin, such as tapioca, or from a grain such as wheat or corn.

Reaction conditions and methods of treatment may be varied widely from those specifically illustrated without departing from the scope of the invention. This reaction between the polysaccharide as, for example, cellulose, and $\beta,\beta'$-oxydipropionitrile takes place in the presence of an alkaline catalyst. Various methods may be used for impregnating the polysaccharide with the alkaline catalyst. The method of soaking the cellulose or polysaccharide in an excess of an aqueous solution of catalyst followed by squeezing, pressing, or centrifuging to express the excess liquid is preferred since this provides for more uniform distribution of catalyst throughout the polysaccharide. However, the exact amount of water and catalyst to be employed may be added to the polysaccharide and after thorough mixing, the $\beta,\beta'$-oxydipropionitrile may be added. Or, the desired reaction may be effected by mixing the $\beta,\beta'$-oxydipropionitrile with the polysaccharide before or during the addition of the alkaline catalyst.

As the strongly basic hydroxide, there may be used the water-soluble hydroxide of an alkali metal, such as sodium or potassium hydroxide, quaternary ammonium hydroxides such as benzyl trimethyl ammonium hydroxide or dibenzyl diethyl ammonium hydroxide, or mixtures of such hydroxides. Other alkaline agents which serve to swell and disperse the cellulose and catalyze the addition of the $\beta,\beta'$-oxydipropionitrile include alkali metal cyanides and the alkali metal carbonates and phosphates such as sodium cyanide, potassium carbonate, sodium phosphate, and the like.

The concentration of the alkaline agent may vary in strength from as little as 0.1% to about 20%. Preferably, concentrations from about 2% to about 10% should be used. The ranges specified refer to the concentration of the alkaline catalyst in the impregnating bath and not to the amount of sodium hydroxide absorbed by the cellulose after the impregnation step.

The amount of water necessary in the reaction mixture may vary over rather wide limits and depends upon a number of factors: the amount of the polysaccharide employed, the amount of $\beta,\beta'$-oxydipropionitrile used, the optimum reaction rate, and the degree of substitution desired in the cyanoethylated product. In general, quantities of water from 20 to 400% by weight of the polysaccharide reacted may be used. The optimum range probably lies between 50-150% although percentages below 50 may be satisfactorily employed under some circumstances.

The amount of $\beta,\beta'$-oxydipropionitrile to be added to the polysaccharide material depends somewhat upon the degree of etherification desired in the final product. In general, the amount required ranges from at least five to about forty parts by weight of $\beta,\beta'$-oxydipropionitrile per part of polysaccharide. Where provision is made for very efficient contact between the polysaccharide material and the $\beta,\beta'$-oxydipropionitrile it is generally satisfactory to employ about 10 to 15 parts by weight of the nitrile for each part of the polysaccharide. Amounts larger than those actually required for the reaction or necessary to provide a workable reaction mixture are impractical for economical reasons.

The process of the invention may be conducted at various temperatures ranging from room temperature up to reflux temperature or higher. The process is usually satisfactorily carried out in the range from about 25° C. to about 140° C. Preferably, however, the reaction is controlled at a temperature from about 70 to about 100° C.

The time required for the reaction depends upon the degree of substitution desired in the product which in turn depends upon several other factors such as the concentration of the catalyst, the temperature of the reaction, and the proportions of $\beta,\beta'$-oxydipropionitrile and water employed. An increase in temperature will generally accelerate the reaction as will an increase in catalyst concentration. In general, other factors being regulated, the degree of substitution in the cyanoethylated product increases with an increase in the time the reaction is allowed to run. Reaction times of from 1 to 10 hours and preferably from about 3 to about 5 hours produce materials whose modified properties make them useful in applications where the untreated material finds no utility. The cyanoethyl ethers of the invention are useful as intermediates for further reaction with esterifying or etherifying agents and find direct application in the preparation of coating compositions, films and foils, as oil well drilling mud additives, in adhesives manufacture, and in many other applications.

The invention is not restricted to treatment of only raw cellulosic material but may be applied as well to preformed articles such as yarns and woven fabric or yard goods. For example, cotton cloth may be cyanoethylated in appropriate equipment, such as a jig and padder, or in a continuous fashion by padding on the dilute caustic followed by immersion of the fabric in tanks of $\beta,\beta'$-oxydipropionitrile equipped with squeeze rolls and maintained at the required temperature. After treatment with $\beta,\beta'$-oxydipropionitrile, the cloth may then be passed through a cold water wash, an acid wash, and then several additional cold water washes. The material so treated has the same physical form as before the reaction but the fixation of nitrogen in the fabric gives it certain desirable physical properties it did not previously possess. The treated material for example has permanent resistance to attack by mildew and bacteria; is more resistant to wet and dry heat degradation; is more receptive to dyes, particularly acid dyes; and has more resistance to abrasion. These improved properties are achieved with no sacrifice in appearance, hand, or processing characteristics, all of which still compare favorably with the untreated cloth.

What is claimed is:

1. The process of preparing cyanoethyl ethers of polysaccharides which comprises reacting, at a temperature from about 25° C to about 140° C., a polysaccharide chosen from the group consisting of cellulose and starch with from about 5 parts to about 40 parts by weight of $\beta,\beta'$-oxydipropionitrile per part of the polysaccharide in the presence of water containing from about 0.1 to about 20% by weight of an alkali metal hydroxide, the amount of said water being within the range from about 20% to about 400% by weight of the polysaccharide.

2. The process of preparing cyanoethyl ethers of polysaccharides which comprises reacting, at a temperature from about 70° C. to about 100° C., a polysaccharide chosen from the group consisting of cellulose and starch with from about 10 parts to about 15 parts by weight of $\beta,\beta'$-oxydipropionitrile per part of the polysaccharide in the presence of water containing from about 2 to about 10% by weight of sodium hydroxide, the amount of said water being within the range from about 20 to about 400% by weight of the polysaccharide.

3. The process of preparing cyanoethyl ethers of cellulose which comprises reacting, at a temperature from about 25° C. to about 140° C., cellulose with from about 5 parts to about 40 parts by weight of $\beta,\beta'$-oxydipropionitrile per part of cellulose in the presence of water containing from about 0.1 to about 20% by weight of an alkali metal hydroxide, the amount of said water being within the range from about 20% to about 400% by weight of the cellulose.

4. The process of preparing cyanoethyl ethers of cellulose which comprises reacting, at a temperature from about 70° C. to about 100° C., cellulose with from about 10 parts to about 15 parts by weight of $\beta,\beta'$- oxydipropionitrile per part of the cellulose in the presence of water containing from about 2 to about 10% by weight of sodium hydroxide, the amount of said water being within the range from about 20 to about 400% by weight of the cellulose.

5. The process of preparing cyanoethyl ethers of cellulose which comprises impregnating the cellulose with an aqueous solution containing from about 2 to about 10% by weight of sodium hydroxide, removing the excess solution remaining in the impregnated cellulose until the uptake of solution by the cellulose is from about 100 to about 150% by weight of the dry cellulose, reacting the thus impregnated cellulose with from about 10 to about 15 parts by weight of $\beta,\beta'$-oxydipropionitrile per part of dry cellulose at a temperature from about 70 to about 100° C., and recovering the solid cyanoethyl ether of cellulose formed from the solution.

6. The process of preparing cyanoethyl ethers of starch which comprises reacting, at a temperature from about 25° C. to about 140° C., starch with from about 5 parts to about 40 parts by weight of $\beta,\beta'$-oxydipropionitrile per part of starch in the presence of water containing from about 0.1 to about 20% by weight of an alkali metal hydroxide, the amount of said water being within the range from about 20% to about 400% by weight of the starch.

7. The process of preparing cyanoethyl ethers of starch which comprises reacting, at a temperature from about 70° C. to about 100° C., starch with from about 10 parts to about 15 parts by weight of $\beta,\beta'$-oxydipropionitrile per part of the cellulose in the presence of water containing from about 2 to about 10% by weight of sodium hydroxide, the amount of said water being within the range from about 20 to about 400% by weight of the starch.

(References on following page)

References Cited in the file of this patent

UNITED STATES PATENTS

| | | |
|---|---|---|
| 2,216,095 | Britton et al. | Sept. 24, 1940 |
| 2,390,032 | Stallings | Nov. 27, 1945 |
| 2,415,042 | Rust | Jan. 28, 1947 |
| 2,535,690 | Miller et al. | Dec. 26, 1950 |
| 2,579,580 | Howk et al. | Dec. 25, 1951 |

OTHER REFERENCES

Textile Research Jour., vol. XXV, No. 3, March 1955, "The Preparation of Partially Cyanoethylated Cotton With Acrylonitrile," by Daul et al. (page 251).